United States Patent
Ligman et al.

(10) Patent No.: US 12,013,775 B2
(45) Date of Patent: Jun. 18, 2024

(54) BUILDING COVERAGE METRICS AND TESTING STRATEGIES FOR MOBILE TESTING VIA VIEW ENUMERATION

(71) Applicant: International Business Machines Corporation, Armonk, NY (US)

(72) Inventors: Joseph William Ligman, Wilton, CT (US); Marco Pistoia, Amawalk, NY (US); Gegi Thomas, Piermont, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/964,210

(22) Filed: Dec. 9, 2015

(65) Prior Publication Data
US 2017/0168922 A1    Jun. 15, 2017

(51) Int. Cl.
G06F 9/44     (2018.01)
G06F 3/14     (2006.01)
G06F 11/36    (2006.01)

(52) U.S. Cl.
CPC .............................. G06F 11/3676 (2013.01)

(58) Field of Classification Search
CPC ............................. G06F 9/30065; G06F 9/325
See application file for complete search history.

(56) References Cited

U.S. PATENT DOCUMENTS

| | | | |
|---|---|---|---|
| 7,130,783 B1 * | 10/2006 | Harer | G06F 11/261 703/13 |
| 7,603,115 B2 | 10/2009 | Banavar et al. | |
| 8,402,049 B2 * | 3/2013 | Miyajima | G06F 17/30902 707/661 |
| 9,021,446 B2 * | 4/2015 | Prakash | G06F 11/3676 717/124 |
| 9,075,788 B1 * | 7/2015 | Roth | G06F 11/3006 |
| 2006/0094438 A1 | 5/2006 | Hamilton et al. | |
| 2007/0078531 A1 * | 4/2007 | Adra | G06Q 10/00 700/31 |
| 2008/0148235 A1 * | 6/2008 | Foresti | G06F 11/3604 717/125 |
| 2009/0007223 A1 * | 1/2009 | Centonze | G06F 21/6227 726/1 |
| 2009/0320002 A1 * | 12/2009 | Peri-Glass | G06F 8/38 717/124 |
| 2010/0323657 A1 * | 12/2010 | Barnard | H04M 1/663 455/404.1 |
| 2012/0072968 A1 * | 3/2012 | Wysopal | G06F 11/3612 726/1 |
| 2012/0159420 A1 * | 6/2012 | Yassin | G06F 11/3672 717/101 |
| 2013/0084855 A1 | 4/2013 | Ekici et al. | |

(Continued)

Primary Examiner — S. Sough
Assistant Examiner — Mohammad H Kabir
(74) Attorney, Agent, or Firm — Anthony R. Curro

(57) ABSTRACT

A method and method for testing an application includes performing a static analysis of metadata of coding of an application, using a test application program executed by a processor on a computer. Available user interface states are simulated based on the static analysis. A configuration file of the application is accessed and parsed to enumerate states possible for the application. A coverage metric is calculated for the application based on a number of states reached by the simulating and a number of states possible.

16 Claims, 4 Drawing Sheets

(56) References Cited

U.S. PATENT DOCUMENTS

| | | | |
|---|---|---|---|
| 2013/0097706 A1* | 4/2013 | Titonis | G06F 21/56 |
| | | | 726/24 |
| 2013/0124317 A1* | 5/2013 | Ramer | G06F 17/30867 |
| | | | 705/14.53 |
| 2013/0152047 A1* | 6/2013 | Moorthi | G06F 11/3688 |
| | | | 717/124 |
| 2013/0281135 A1* | 10/2013 | Cryderman | H04W 88/04 |
| | | | 455/466 |
| 2014/0282421 A1* | 9/2014 | Jubran | G06F 11/3664 |
| | | | 717/126 |
| 2015/0050889 A1* | 2/2015 | Axmon | H04W 24/08 |
| | | | 455/67.11 |
| 2015/0169431 A1* | 6/2015 | Ivankovic | G06F 11/3676 |
| | | | 717/124 |
| 2015/0309813 A1* | 10/2015 | Patel | G06F 8/75 |
| | | | 703/22 |
| 2016/0357422 A1* | 12/2016 | Milden | G06F 3/04847 |

* cited by examiner

BUILDING COVERAGE METRICS AND TESTING STRATEGIES FOR MOBILE TESTING VIA VIEW ENUMERATION

TECHNICAL FIELD

The present invention generally relates to determining coverage metrics for mobile device application. More specifically, a static analysis of code provides a basis for simulation of an application and a crawler searches through the mobile application's configuration file in order to enumerate and render the different possible views.

BACKGROUND

Mobile testing is an emerging area, which is receiving great attention lately thanks to the prevalence and popularity of smartphones, and the rich and diverse landscape of smartphone applications, also referred herein as apps. These apps often have bugs and stability problems, which sharpens the need for appropriate testing tools for such apps.

Application testing involves testing application software for handheld mobile devices for functionality, usability, and consistency and can implemented manually or automated. Challenges arise because of the growing differences in mobile devices, such as differences in screen sizes, input methods, and hardware capabilities, operating systems, network operators, and even testing method used.

One of the key questions in testing concerns the coverage guarantees of the testing algorithm. The amount of such coverage allows insight into the quality and completeness of the testing report. As an example, if the testing tool searches for security vulnerabilities while still ensuring high testing coverage, then the developer running the tool can gain some confidence by the tool's failing to find any security vulnerabilities.

An important consequence of the testing tool's awareness of its coverage is that, in a situation where the tool suffers from low coverage, proactive steps can be taken. For example, the user can be asked to assist the tool in discovering more of the testing surface of the subject application by, for example, manually filling a form or text box to enable transition to a new screen or state. Additionally, more budget can be invested in attempting to enable new transitions by, for example, trying out more values for inputs that would appear to lead to an error state that would demonstrate a stability problem or security vulnerability.

While highly useful, for the reasons outlined above, coverage information is often hard to obtain. A notable example is web applications, where the testing tool does not have any prior knowledge of the site map. This lack of prior knowledge and difficulty in obtaining coverage information is at least partially due to websites typically being highly dynamic and complex, for example, by making intensive use of AJAX commands to drive user interaction. AJAX is short for Asynchronous JavaScript and XML, a set of web development techniques to aid creation of asynchronous Web applications and which permit data to be sent and retrieved from a server asynchronously in the background without interfering with the behavior and display of the existing page. Such capability permits a page to change dynamically without requiring to reload the entire page.

Thus, the present invention arose from recognizing that the developers need methods to scan web and mobile applications to identify security vulnerabilities and make fixes prior to deployment.

SUMMARY

In view of the foregoing, and other, exemplary problems, drawbacks, and disadvantages of the conventional systems, it is an exemplary feature of the present invention to provide a structure (and method) to be able to parse and enumerate different views specified in a mobile app's configuration file in order to permit evaluation of ability to reach one or more views.

In a preferred embodiment, the present invention is a component module that could be added to any of several app testing programs currently available. In one embodiment, the invention is incorporated in an app testing program offered as a cloud service.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION

Figure 1:
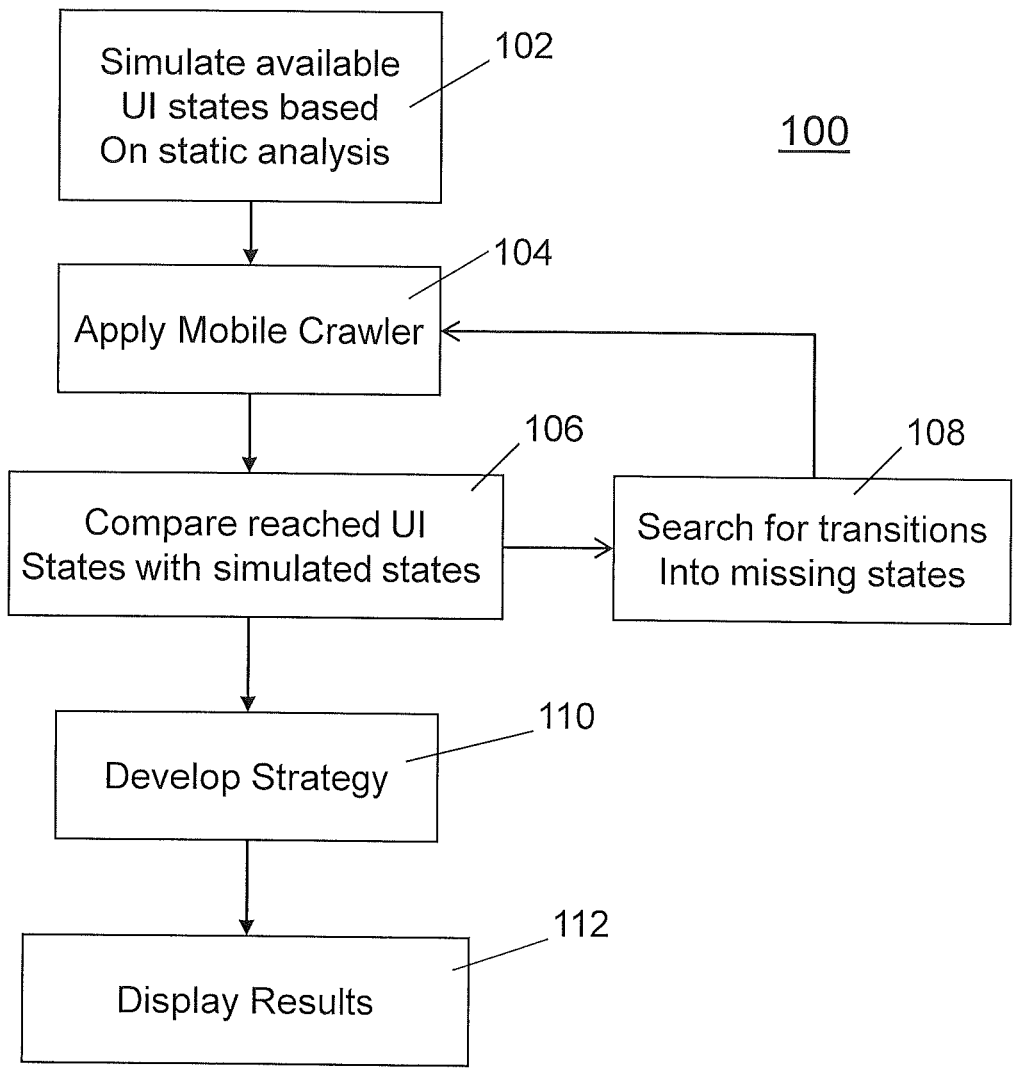
FIG. 1 shows in flowchart format 100 that demonstrates the method of an exemplary embodiment of the present invention.

Referring now to the drawings, and more particularly to FIGS. 1-4, an exemplary embodiment of the method and structures according to the present invention will now be described.

As mentioned, the present inventors have recognized that mobile applications induce a unique testing setting which allows enumerating all the views that may be reachable within the mobile app. This is due to the design of mobile apps in popular platforms, such as Android and iOS, which involves specifying the different display modes of the app in an explicit and declarative fashion. Because of the availability of this information, the present invention recognizes that it is possible for a mobile testing tool to compute effective coverage metrics and additionally take action if coverage does not improve sufficiently relative to testing effort.

The present invention has been embodied as a prototype tool for providing such coverage information, and is planned to be incorporated into a number of products currently offered, including the assignee. The method underlying the invention allows important leverage on the problem of mobile security testing, which is currently the top priority for many customers of the assignee.

This discussion of the present invention begins with a code fragment illustrating how views are listed for an Android app, as follows:

<TextView
android: id="@+id/textVie,v2"
android:layout_width="wrap content"
android: layout_height="wrap content"
android: text="Intent Vulnerabilities"
android: textAppearance="?android: attr/textAppearanceMedium"/>

```
<LinearLayout
android:id="@+id/linearLayout3"
android:layout_width="wrap_content"
android: layout_height="wrap_content"
android: onClick="sendXSSint"ent"
android: text="Send XAS .intent to AI toroA"/>
<Button
android:id="@+id/button2"
android:layout_width="wrap_content"
android: layout_height="wrap_content"
android: onClick="phishDemoTestFire"
android: text="Go Phish (AltoroJ)"/>
<LinearLayout>
<Image View
xmlns: android="http://schemas.android.com/apk/res/android"
android: layout_width="fill_parent"
android: layout_height="wrap_content"
android:paddingBottom="10 dp"
android: paddingLeft="5 dp"
android: paddingRight="5 dp"
android: paddingTop="10 dp"
android: scaleType="fitXY"
android: src="@ android:drawable/divider horizontal dark"/>
<TextView>
android: id="@+id/textView3"
android: layout_width="wrap_content"
android:layout height="wrap_content"
android: text="Insecure File Vulnerability"
android:textAppearance="?android:attr/textAppearanceMedium"/>
<LinearLayout>
Android:id="@+id/linearLayout4"
android:layout_width="match_parent"
android: layout_height="wrap_content">
<Button
android: id="@+id/button5"
android: layout_width="wrap_content"
android: layout_height="wrap_content"
android: onClick="getInsecureFileContent"
android:text="Get Insecure File Content"/>
</LinearLayout>
```

As noted above, the present inventors have designed, and fully implemented, a method for parsing the different views specified in the mobile app's configuration file and enumerating them, including full rendering of the views. This has several important advantages, including:

1. If the testing tool fails to reach one (or more) of the views, then it can prompt the user for help in getting to that view.
2. The testing tool can provide the user with coverage information, e.g., based on the number of views it reached out of the total number of views, the number of controls and inputs it exercised in each of these views out of the total number of controls, etc.
3. Based on the differences between views, both in rendered form and in general, the tool can automatically build strategies for transitioning into views that have been unreachable so far. Here are some illustrative ideas of how this can be done:
    a. One case is two distinct views that differ only in one region (e.g. the bottommost part of the screen). This hints that the action that is responsible for the transition is in that region.
    b. Another observation that can be made is about decompositions of the view:

If views A and B differ only in region R1, and similarly, views B and C differ only in R2, and so on, then this suggests that modular decomposition of each view into regions R1, R2, . . . is a useful strategy for reducing the size of the search space for testing.

FIG. 1 shows an exemplary flowchart 100 that summarizes the steps of an embodiment of the invention. In step 102 the UI (User Interface) states in the code under testing are simulated based on a static analysis of metadata. In step 104, a mobile crawler is applied to parse the configuration file of the app and search for all possible states. In step 106, the tool compares the number of states reached during the UI simulation with the number of possible states, including possibly calculating one or more coverage values, as mentioned above. In step 108, if evaluation determines that there are missing states, the tool searches for transitions into such possible missing states, including possibly soliciting assistance from a user by displaying prompts. In step 110, the tool exercises a number of evaluation techniques, such as those discussed above, to attempt to automatically attempt to build strategies into unreachable states. Finally, in step 112, the tool provides outputs showing its final coverage metrics and conclusions from its attempt to develop one or more strategies to reach unreachable states.

Exemplary Hardware Aspects, Using a Cloud Computing Environment

It is understood in advance that, although this section of the disclosure provides a detailed description on cloud computing, implementation of the teachings recited herein are not limited to a cloud computing environment. Rather, embodiments of the present invention are capable of being implemented in conjunction with any other types of computing environment now known or later developed. Particularly, embodiments of the present invention could be implemented as a standard test component on existing mobile app testing programs. For example, the assignee's Security AppScan Standard Edition and Enterprise Edition mobile security software testing tool could have a module that provide the coverage evaluations of embodiments of the present invention.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
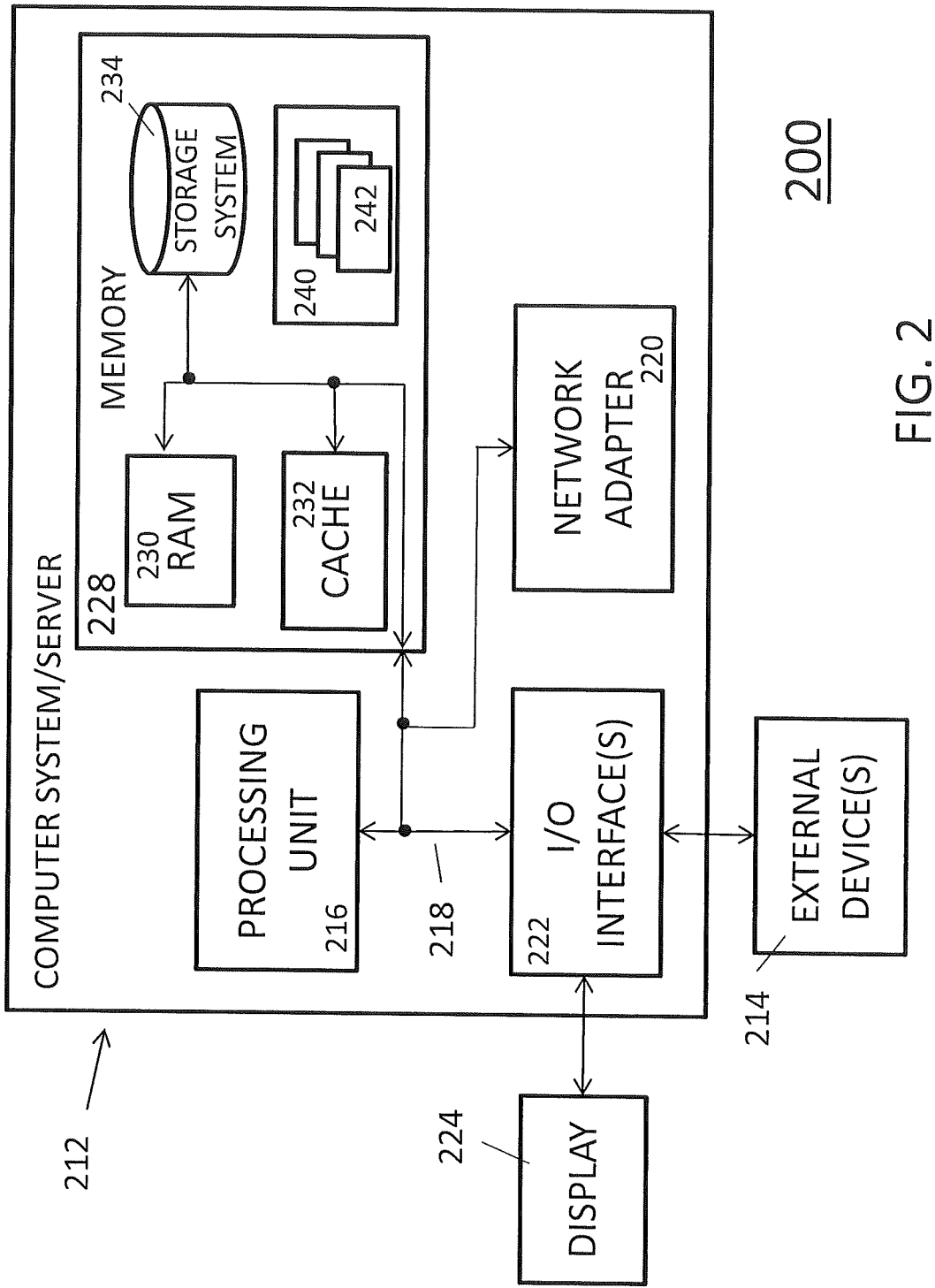
FIG. 2 depicts a cloud computing node 200 according to an exemplary embodiment of the present invention.

Referring now to FIG. 2, a schematic 200 of an example of a cloud computing node is shown. Cloud computing node 200 is only one example of a suitable cloud computing node and is not intended to suggest any limitation as to the scope of use or functionality of embodiments of the invention described herein. Regardless, cloud computing node 200 is capable of being implemented and/or performing any of the functionality set forth hereinabove.

In cloud computing node 200 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 212 in cloud computing node 200 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

Figure 3:
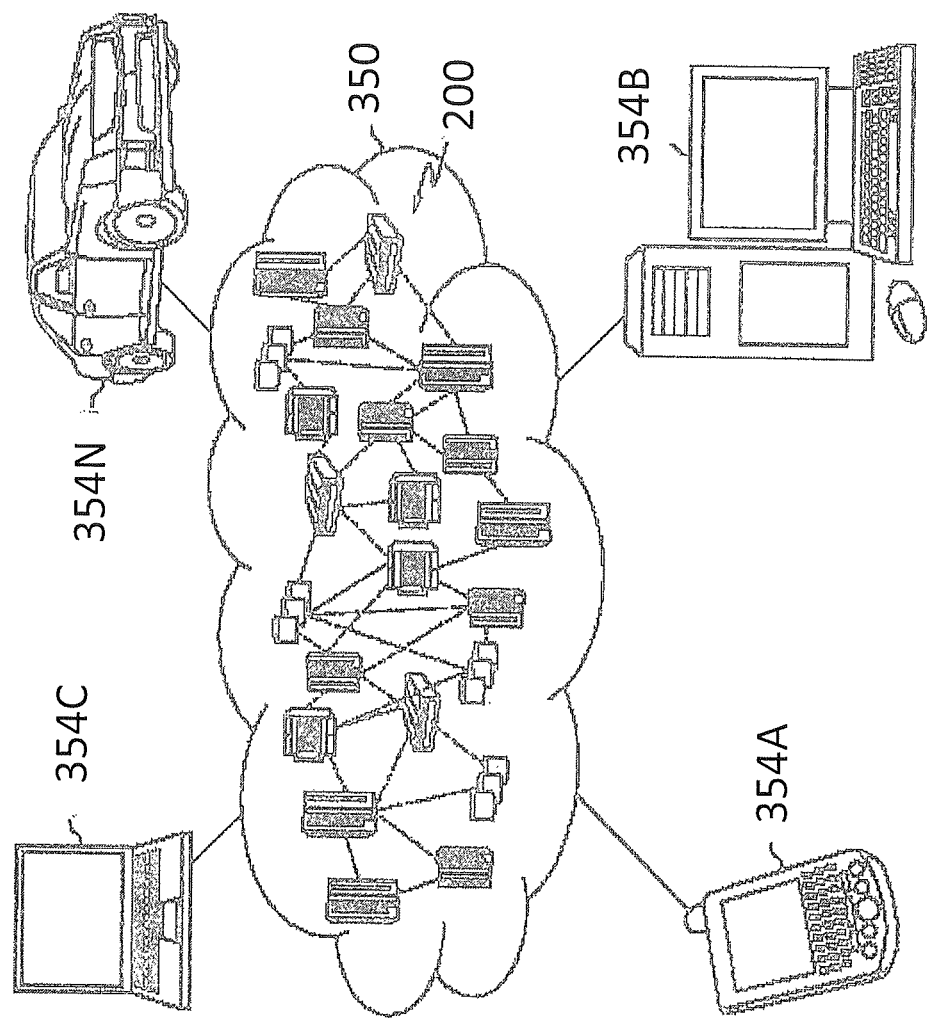
FIG. 3 depicts a cloud computing environment 300 according to an exemplary embodiment of the present invention.

Referring now to FIG. 3, an illustrative cloud computing environment 350 is depicted. As shown, cloud computing environment 350 comprises one or more cloud computing nodes 200 with which local computing devices used by cloud consumers, such as, for example, personal digital assistant (PDA) or cellular telephone 354A, desktop computer 354B, laptop computer 354C, and/or automobile computer system 354N may communicate. Nodes 200 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 3 are intended to be illustrative only and that computing nodes 200 and cloud computing environment 350 can communicate with any type of computerized device over any type of network and/or network addressable connection (e.g., using a web browser).

Figure 4:
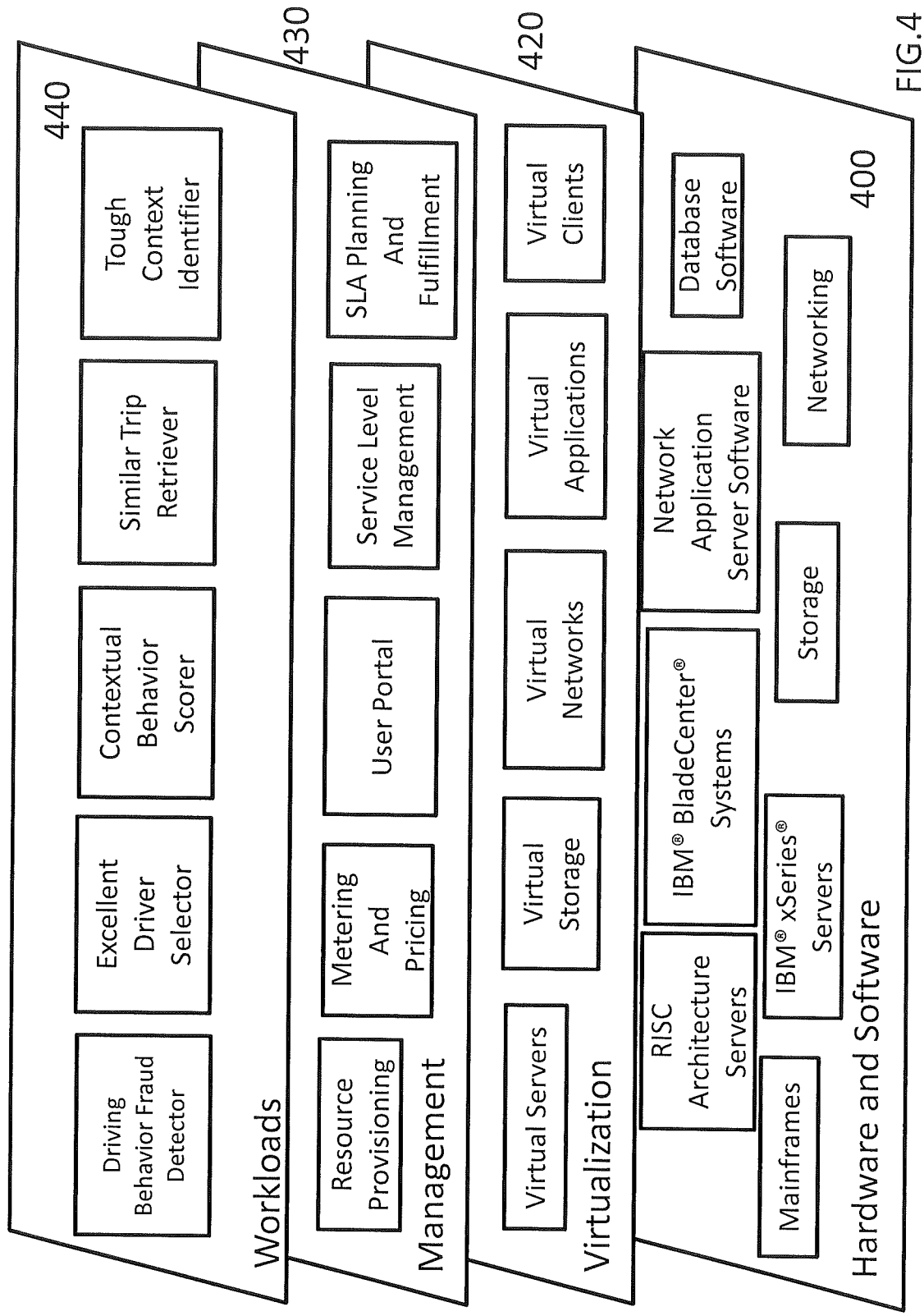
FIG. 4 depicts abstraction model layers 400-440 according to an exemplary embodiment of the present invention.

Referring now to FIG. 4, a set of functional abstraction layers provided by cloud computing environment 350 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The tooling that implements the present invention would be located in layer 400.

Virtualization layer 420 provides an abstraction layer from which the following examples of virtual entities may be provided: virtual servers; virtual storage; virtual networks, including virtual private networks; virtual applications and operating systems; and virtual clients. The virtual machines and network appliances that are generated and instantiated by the tooling of the present invention would operate on layer 420.

In one example, management layer 430 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment module provides pre-arrangement for, and procurement of, cloud computing resources for which a future requirement is anticipated in accordance with an SLA.

Workloads layer 440 provides examples of functionality for which the cloud computing environment may be utilized. Examples of workloads and functions which may be provided from this layer might include any number of functions and applications not even related to the present invention, such as mapping and navigation; software development and lifecycle management; virtual classroom education delivery; data analytics processing; transaction processing; and, more particularly relative to the present invention, such modules for simulation, searching the configuration file, coverage calculations, and development of strategies for transitioning into unreachable states.

While the invention has been described in terms of a single preferred embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of testing an application, said method comprising:

performing a static analysis of metadata of code of an application, using a test application program executed by a processor on a computer, wherein performing the static analysis includes:
simulating the application code to determine available user interface states of the application based on the static analysis of the metadata of the application code;
subsequent to the simulation, accessing and parsing, by a mobile crawler,
a configuration file of the application to enumerate states possible for the application, wherein the accessing and parsing the configuration file includes parsing and enumerating a plurality of different views from the configuration file including enumerating all views reachable by the application; and
calculating a coverage metric for the application based on a difference between a number of states reached by the simulating the available user interface states and a number of the states possible as the enumerated from the configuration file, wherein the calculating the coverage metric further includes:
comparing the number of states reached during the simulation with the number of states possible, including calculating one or more coverage values;
evaluating to determine that there are missing states;
searching for transitions into the missing states; and
automatically building strategies into unreachable states to provide outputs indicating final coverage metrics and conclusions from the building strategies to reach the unreachable states, wherein the automatically building strategies into the unreachable states includes:
determining a transition responsible for different region; and
when the views differ in a region, executing a modular decomposition of each view into the region.

2. The method of claim 1, further comprising determining coverage metrics for a mobile device application from the number of states reached.

3. The method of claim 2, further comprising determining the transitions into the missing states, wherein the determining the transitions comprises exercising at least one stored strategy to automatically exercise the transitions to obtain additional information.

4. The method of claim 3, wherein said stored strategy comprises exercising one or more of the transitions while determining whether a region of a view changes as a result of one of the transitions, and wherein the coverage values are based on a number of the plurality of views, wherein the plurality of views includes at least two distinct views that differ only in one region to indicate that an action the one is responsible for a transition is in the one region.

5. The method of claim 1, wherein the coverage values are based on a number of views reached out of a total number of views, or a number of controls and inputs exercised in each of the views out of a total number of controls, further comprising based on differences between the plurality of different views, both in a rendered form and in a general form, transitioning into views that are unreachable.

6. The method of claim 1, as implemented using one of: a service available on a network server; and a service available as a cloud service, further comprising determining the transitions into the missing states comprises exercising at least one stored strategy to automatically exercise the transitions to obtain additional information.

7. A non-transitory storage medium storing a set of computer-readable instructions of testing an application program, said set of computer-readable instructions to be executed by a processor on a computer to perform a method comprising:
performing a static analysis of metadata of code of an application, using a test application program executed by the processor on the computer;
simulating the application code to determine available user interface states of said application based on said static analysis of the metadata of the coding the application;
accessing and parsing by a mobile crawler a configuration file of said application to enumerate states possible for said application including enumerating all views possible for the application, wherein the accessing and parsing the configuration file includes parsing and enumerating a plurality of different views of the configuration file;
calculating a coverage metric for said application based on a difference between a number of states reached by said simulating of said available user interface states and a number of the states possible as enumerated from said configuration file; and
comparing the number of states reached during the simulation with the number of states possible, including calculating one or more coverage values,
wherein which possible states are missing are determined when said simulating is completed according to the metadata of the code of the application,
wherein the user interface states in a code under testing are simulated based on the static analysis of the metadata, and
when evaluation determines that there are missing states, searching for transitions into any missing states, and automatically building strategies into unreachable states to output indicating the coverage metrics.

8. The non-transitory storage medium of claim 7, wherein said method is embodied as a module in an application testing program, and
wherein the calculating further comprises comparing the number of states reached with the number of possible states,
wherein a mobile crawler is applied for parsing the configuration file of the application and search for all possible states.

9. The non-transitory storage medium of claim 8, wherein said application testing program is implemented using one of:
a service available on a network server; and
a service available as a cloud service,
further comprising determining transitions into missing states comprises exercising at least one stored strategy to automatically exercise transitions to obtain additional information.

10. An apparatus, comprising:
a processor; and
a memory system accessible by said processor, wherein said memory system stores a set of computer-readable instructions that permit said processor to execute a method of testing an application program, said set of computer-readable instructions comprising:
performing a static analysis of metadata of code of an application, using a test application program executed by a processor on a computer;
simulating the application code to determine available user interface states of said application based on said static analysis of the metadata of the code of the application;

accessing and parsing a configuration file of said application to enumerate states possible for said application, wherein the accessing and parsing the configuration file includes parsing and enumerating a plurality of different views of the configuration file;

calculating a coverage metric for said application based on a difference between a number of the states reached by said simulating of said available user interface states and a number of states possible as enumerated from said configuration file;

determining which possible states are missing when said simulating is completed according to the metadata of the code of application; and comparing the number of states reached during the simulation with the number of states possible, including calculating one or more coverage values, wherein the user interface states in a code under testing are simulated based on the static analysis of the metadata.

11. The apparatus of claim 10, wherein said memory system comprises:

a memory device storing instructions for application programs selectively executed by said processor or that can be selectively downloaded to a computer via a network;

and a memory device storing instructions for an application program currently being executed by said processor, wherein a mobile crawler is applied for parsing the configuration file of the application and search for all possible states.

12. The apparatus of claim 11, as comprising one of:

a network server; and a computer on a network that provides application program to be available as a cloud service, wherein the calculating further comprises comparing the number of states reached with the number of possible states.

13. The apparatus of claim 10, wherein said coverage metric and said number of states reached takes into account any missing states reached via a prompt or prompts to a user to arrive at a missing state and any missing states reached using any automatically exercised transitions.

14. The apparatus of claim 10, further comprising at least one of: determining one or more transitions into said missing states; and providing a prompt to a user to arrive at a missing state, based on said determining of transitions, wherein calculating the coverage metric of guarantees includes coverage information based on a number of views reached out of a total number of views to indicate quality and completeness of testing.

15. The method apparatus of claim 14, wherein said determining of transitions missing states comprises at least one of:

in a case in which two distinct views differ only in one region, determining a transition responsible for different region; and in a case in which views $A_n$ and $B_{n+1}$ differ only in region Rn, then making a modular decomposition of each view into regions Rn, wherein n is an integer, for reducing a size of a search space for testing.

16. The apparatus of claim 10, wherein said method further comprises at least one of:

determining one or more transitions into said missing states; and providing a prompt to a user to attempt to arrive at a missing state.

* * * * *